United States Patent [19]

Gallusser et al.

[11] Patent Number: 5,201,019

[45] Date of Patent: Apr. 6, 1993

[54] FIBER OPTIC SPLICE CONNECTION AND A METHOD OF MAKING SAME

[75] Inventors: David O. Gallusser; John H. Mikolaicyk, both of Oneonta

[73] Assignee: Amphenol Corporation, Wallingford, Conn.

[21] Appl. No.: 729,982

[22] Filed: Jul. 15, 1991

[51] Int. Cl.⁵ .................................................. G02B 6/38
[52] U.S. Cl. ................................. 385/99; 385/62; 385/66; 385/98; 385/136
[58] Field of Search .................... 385/62, 66, 136, 81, 385/97, 98, 99, 95, 51

[56] References Cited

U.S. PATENT DOCUMENTS

| | | | |
|---|---|---|---|
| 4,196,965 | 4/1980 | Matsuno | 385/98 |
| 4,204,306 | 5/1980 | Makuch | 29/281.5 |
| 4,470,660 | 9/1984 | Hillegonds et al. | 385/58 |
| 4,486,072 | 12/1984 | Roberts | 385/64 |
| 4,487,474 | 12/1984 | Nishie et al. | 385/66 |
| 4,607,911 | 8/1986 | Rhodes | 385/86 |
| 4,614,401 | 9/1986 | Strait, Jr. | 385/64 |
| 4,614,402 | 9/1986 | Caron et al. | 385/62 |
| 4,634,214 | 1/1987 | Cannon, Jr. et al. | 385/86 |
| 4,650,276 | 3/1987 | Lanzisera et al. | 385/88 |
| 4,674,833 | 6/1987 | Des Forges et al. | 385/85 |
| 4,681,398 | 7/1987 | Bailey et al. | 385/79 |
| 4,696,537 | 9/1987 | Bauer et al. | 385/81 |
| 4,699,460 | 10/1987 | Szentesi | 385/71 |
| 4,718,745 | 1/1988 | Strait, Jr. | 385/64 |
| 4,728,171 | 3/1988 | Schofield et al. | 385/135 |
| 4,738,505 | 4/1988 | Jones | 385/86 |
| 4,741,591 | 5/1988 | Grabbe et al. | 385/98 |
| 4,746,194 | 5/1988 | Rasmussen | 385/80 |
| 4,810,277 | 3/1989 | Waitl et al. | 385/99 |
| 4,812,008 | 3/1989 | Tokumaru et al. | 385/70 |
| 4,846,545 | 7/1989 | Estabrook et al. | 385/99 |
| 4,887,875 | 12/1989 | Chang et al. | 385/60 |
| 4,915,471 | 4/1990 | Zimmermann et al. | 385/95 |
| 4,953,941 | 9/1990 | Takahashi | 385/72 |
| 4,964,690 | 10/1990 | Lappoehn | 385/58 |
| 5,009,474 | 4/1991 | Wurmser et al. | 385/99 |
| 5,022,735 | 6/1991 | Dahlgren | 385/99 |

OTHER PUBLICATIONS

Amp, Incorporated, Product Catalog, p. 44, 1989.

*Primary Examiner*—Brian Healy
*Attorney, Agent, or Firm*—Bacon & Thomas

[57] ABSTRACT

A durable, low loss splice connection for optical cables includes two ceramic optical fiber guide members which are held in axial and angular alignment by an alignment sleeve, and in butt joint intimate contact by a spring tension clip. The connection is mechanically and environmentally sealed by a heat shrink tube having an interior diameter coated with hot melt adhesive.

33 Claims, 3 Drawing Sheets

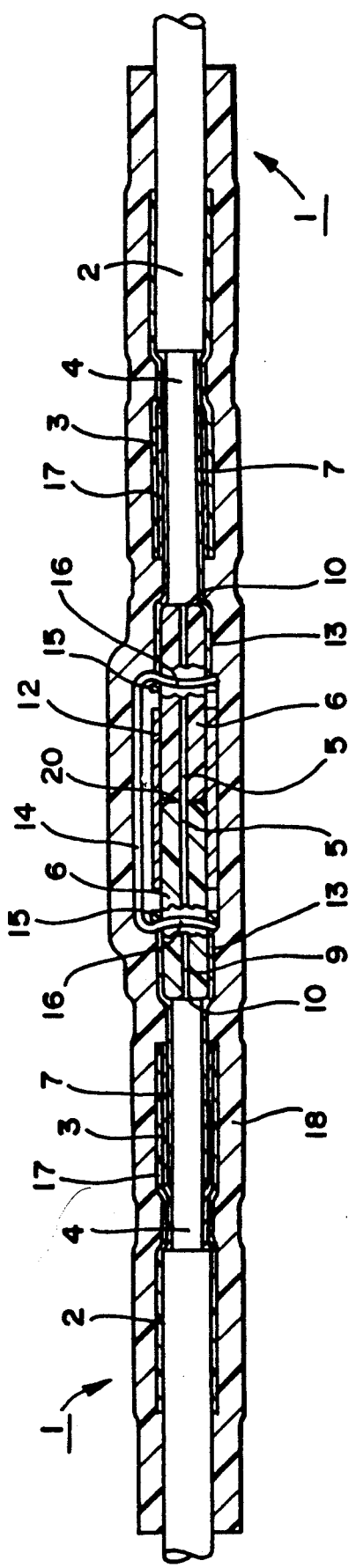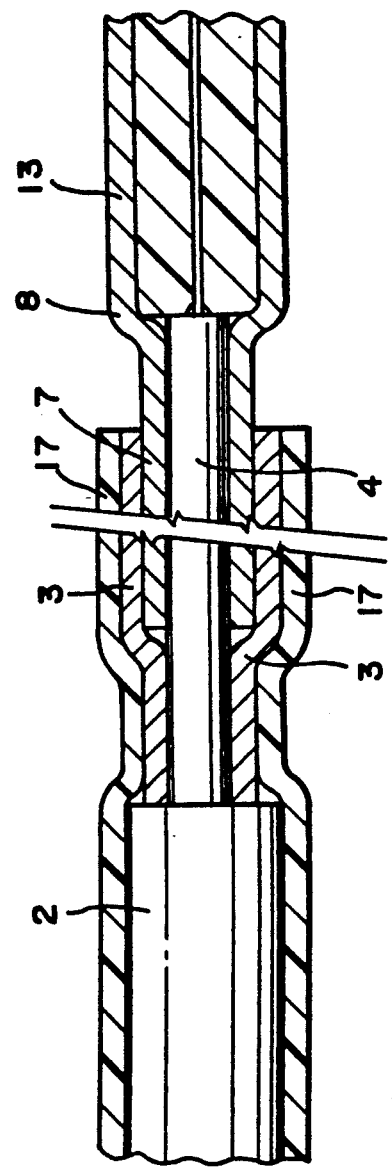

FIBER OPTIC SPLICE CONNECTION AND A METHOD OF MAKING SAME

BACKGROUND OF THE INVENTION

1. Field of the Invention

This invention relates to a method and apparatus for repairing a fiber optic line break.

2. Description of Related Art

Numerous techniques are available for splicing or repairing breaks in electrical cables. However, in the case of fiber optic cables, it has conventionally been necessary to replace rather than repair the line when a break occurs. This is because the accuracy required for a fiber optic splice connection is extremely high in comparison with the accuracy or tolerances required to effect an electrical connection and, therefore, achieving a satisfactory optical connection is much more difficult than achieving a satisfactory electrical connection.

Examples of previous fiber optic cable splicing or connection techniques are shown in U.S. Pat. Nos. 4,738,505, 4,812,008, 4,846,545, 4,953,941, and 4,964,690. None of the previous techniques, however, is completely suitable for repairing breaks under "field" conditions, in which the splice connection must be effected as rapidly as possible, with as few tools as possible, and yet still be permanent in nature and environmentally sealed. Such conditions are found, for example, on an aircraft carrier flight deck.

With the increasing use of fiber optic cables, there is a critical need for field installable fiber optic splice connections which may be made under a variety of conditions, and which nevertheless provide high integrity low loss connections that are essentially permanent in nature. An acceptable field installable splice connection must be durable, have a minimum insertion loss and use a minimum number of parts, and at the same time avoid the need for fusion splicing of the fibers or other complex joining techniques.

SUMMARY OF THE INVENTION

It is therefore an objective of the invention to provide an inexpensive, high integrity, low loss, and field installable fiber optic splice connection which can be made under a variety of conditions, for example on an aircraft carrier flight deck.

It is another objective of the invention to provide a fiber optic splice connection which requires few tools, avoids the need for fusion splicing or other exotic splicing techniques, and which nevertheless minimizes insertion losses by minimizing deviation in the axial centers of opposing optical fiber cores.

It is a still further objective of the invention to provide an inexpensive, high integrity, low loss, and field installable fiber optic splice connection which is environmentally sealed against moisture and airborne contaminants.

It is also an objective of the invention to provide a kit of parts for effecting an inexpensive, high integrity, low loss, and field installable fiber optic splice connection, the kit including two ceramic fiber guide members, two stainless steel cable support members, an alignment sleeve, a spring clip, and three lengths of tubing for sealing and protecting the splice connection.

Finally, it is an objective of the invention to provide a method of effecting a field installable fiber optic cable repair or splice connection which requires few tools, minimizes insertion losses, and yet provides a connection which is essentially permanent in nature.

As will be described in greater detail below, these objectives are achieved by providing a field installable fiber optic splice connection arrangement in which each cable is held by a cylindrical cable support member placed between a cable strength member and a cable buffer and arranged to hold a ferrule or guide member. The guide members include bores through which the optical fibers of the two cables respectively pass. The fibers are aligned by an alignment sleeve which holds the respective guide members for the two cables in axial and angular alignment, and the guide members are held in "butt-edge" alignment by a spring tension clip which engages the cable support members to press them, and consequently the guide members, towards each other. A heat shrink tube coated with hot melt adhesive provides a seal for the splice connection.

BRIEF DESCRIPTION OF THE DRAWINGS

FIG. 1 is a cross-sectional side view of a field installable, environmentally sealed fiber optic splice connection arrangement in accordance with a preferred embodiment of the invention.

FIG. 8 is an enlargement of a portion of FIG. 1, showing the termination section of the inventive splice connection.

DETAILED DESCRIPTION OF THE PREFERRED EMBODIMENTS

Figures 2, 3:
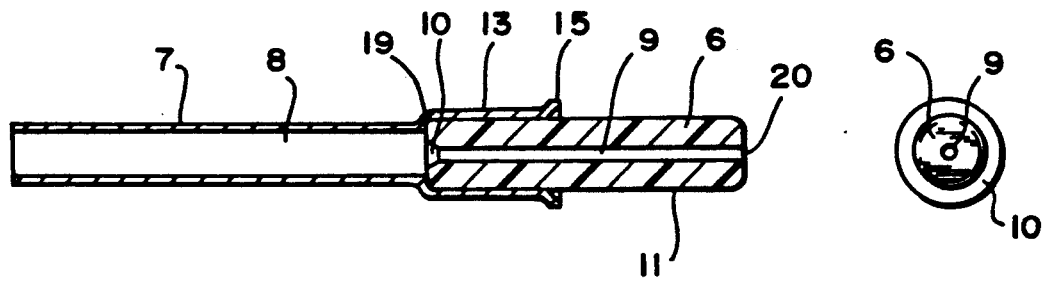
FIG. 2 is a cross-sectional side view of a splice terminus for use in the splice connection of FIG. 1.
FIG. 3 is an elevated end view of the splice terminus of FIG. 2.
Figures 4, 5:
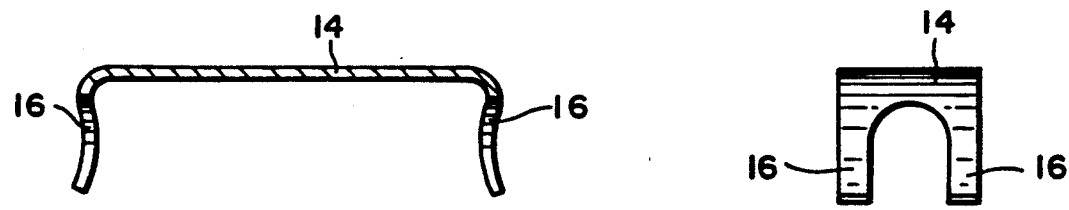
FIG. 4 is a cross-sectional side view of a splice clip for use in the splice connection of FIG. 1.
FIG. 5 is an elevated end view of the splice clip of FIG. 4.
Figure 6:
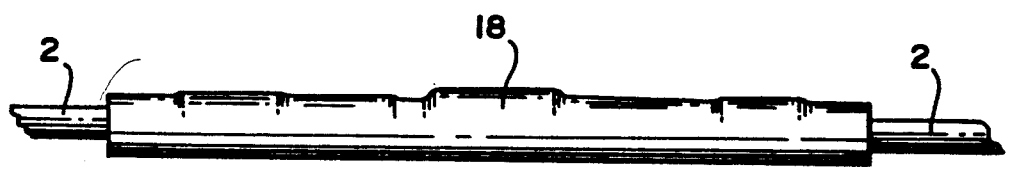
FIG. 6 is an elevated side view of the splice connection of FIG. 1.

FIG. 1 shows a complete splice connection for a typical optical fiber cable 1. Cable 1 includes an outer jacket 2 which encloses a cable strength or reinforcement member 3 and a cable buffer 4. Buffer 4 carries a single strand optical fiber 5.

Those skilled in the art will appreciate that the invention is applicable to a variety of different optical cable configurations, including those with multiple buffer layers between the cable strength member and the fiber, those which use multiple fibers, and those which omit the strength or reinforcement member, and also to configurations in which the cable is a single or multimode cable with stepped or graded index.

Figure 7:
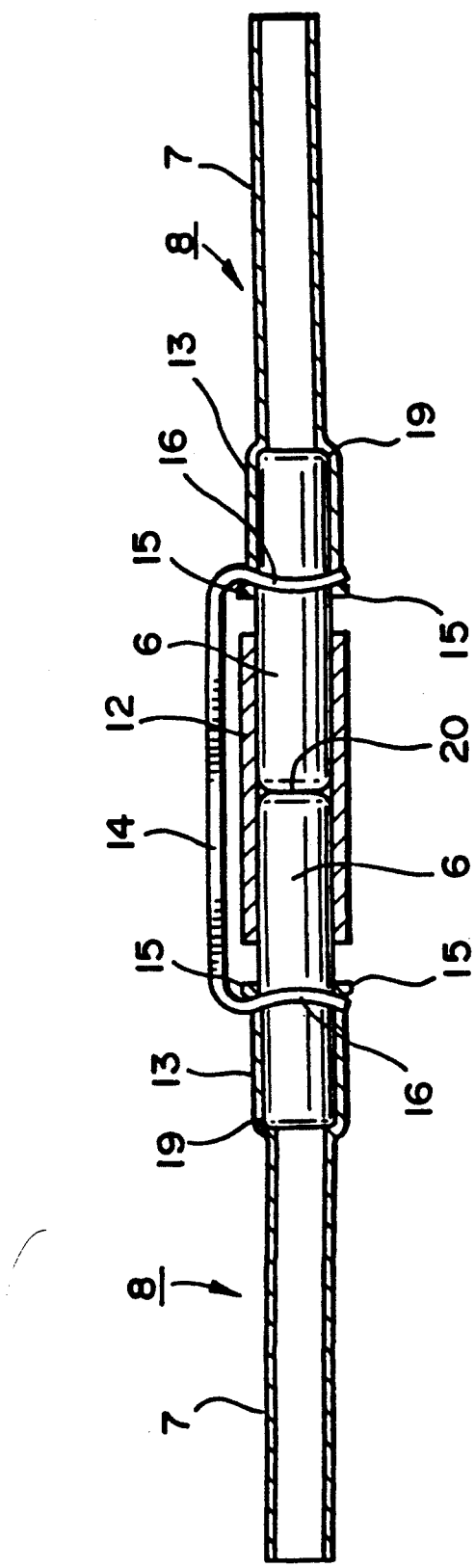
FIG. 7 is a cross-sectional side view of the splice connection arrangement of FIG. 1, with optical cable and protective tubing removed for illustrative purposes.

Cable 1 is initially prepared by stripping outer jacket 2, strength member 3, and buffer 4 from optical fiber 5 a distance equal to or slightly greater than the length of a guide member 6, and subsequently removing a length of strength member 3 to expose an end of cable buffer 4. Cable outer jacket 2 is stripped an additional length approximately equal to the length of a cable support portion 7 of cable support member 8. Cable support member 8 and guide member 6 form a splice terminus for aligning the exposed optical fiber 5 of the cable, as shown in FIGS. 2, 3, and 7.

Guide member 6 includes a central longitudinal bore 9 having a diameter equal to that of optical fiber 5. An enlarged portion 10 of bore 9 at one end of guide 6 facilitates insertion of the exposed optical fiber into the aperture. In the case of a multiple fiber cable, a plurality of bores may be provided, one for each fiber. Guide member 6 is preferably made of a ceramic material, although other materials having sufficient hardness, dimensional stability, and an ability to be manufactured to required tolerances, may by substituted for the preferred material.

The ceramic guides 6 for each cable to be joined are aligned at the interface 20 between optical fibers by a cylindrical alignment sleeve 12, preferably ceramic, which fits around the outside 11 of cylindrical guides 6 and which holds the guides in axial and angular alignment.

Cable buffer 4 has a diameter equal to an inner diameter of cylindrical cable support portion 7 of cable support member 8, which is inserted between the cable buffer and cable strength member 3, as shown in FIG. 1. Support member 8 also includes a main body portion 13 which holds ceramic guide 6 relative to cable buffer 4. Although support member 8 is preferably made of stainless steel, or a similar metal, it will be appreciated that numerous other materials may be substituted.

As shown in FIGS. 2, 3, and 7, at the end of main body portion 13 is an enlarged portion or lip 15. A resilient splice clip 14 engages lip 15 on each cable support member in order to maintain tension on main body portions 13, and consequently on ceramic guides 6 via shoulders 19 of support members 8, thereby providing axial compression of the butted interfaces of opposing guides 6. Legs 16 of spring tension clip 14 are preferably arranged to be manually snapped over lips 15 of guide members 6, thus providing a permanent connection between the cables, without the need for any special tools.

In order to provide additional support, to prevent fraying of the exposed cable strength member and jacket, and to secure the stainless steel body 8 within the cable strength member, terminus shrink tubes 17 may be provided. In addition, the entire splice connection is enclosed within an external shrink tubing 18, provided for mechanically and environmentally sealing the splice connection against penetration by moisture, dust, and other contaminants. In an especially advantageous embodiment of the invention, tubing 18 has an inner diameter coated with hot melt adhesive.

The above elements make possible a uniquely simple method of establishing an optical fiber splice connection. It is estimated that the maximum time which would be needed by a technician to complete the termination using the preferred method and a kit containing the above-described parts is approximately 10 minutes, and the connection could easily be made under such difficult conditions as exist on an aircraft carrier flight deck or runway.

Despite its advantages, just nine elements or less are required in the splice connection kit. These include two ceramic guides 6, two holders 8, a splice clip 14; and alignment sleeve 12. The remaining elements are shrink tubes 17 and 18. The only tools necessary to complete the connection are cable stripping tools, a heating element such as a hot air gun for heating the shrink tubes, and a polishing kit.

As will be apparent from the above description, the first step in splicing together two optical cables or repairing a broken optical cable according to the preferred method is to strip and prepare the ends of the cables to expose the optical fibers 5, cable buffers 4, and cable reinforcement 3. Next, stainless steel support member 8 is fitted over cable buffer 4 and optical fiber 5 is inserted into bore 9 in ceramic guide 6 such that ceramic guide 6 is received in main body portion 13 of stainless steel body 8, while cable support portion 7 is fitted between cable reinforcement 3 and buffer 4. If necessary, fiber 5 is then trimmed, polished, or chemically etched so that it is sufficiently smooth and does not extend beyond surfaces 20 of guides 6. Also, at this time, shrink tubes 17 may be fitted and heated to secure members 8 to the cable ends.

Once the ceramic guides 6 are installed on the cable ends, they may be inserted into alignment sleeve 12. Spring clip 16 is then manually snapped onto shoulders or lips 15 of the stainless steel bodies 8 to apply a compressive axial force to the ceramic guides 6 and ensure a positive interface between the optical fiber ends present at surfaces 20. Shrink tube 18 is then fitted over the splice connection and heated, for example by a portable hot air gun, to cure the shrink tubes and provide a durable, environmentally sealed, low loss connection that is essentially permanent in nature.

It will of course be appreciated that variations of the above method and apparatus may be made by those skilled in the art without departing from the scope of the invention. Consequently, it is intended that the invention be limited solely by the appended claims.

We claim:

1. Apparatus for providing a connection between two optical cables, comprising:
   alignment means for axially aligning optical fibers in said two cables;
   compression means for applying a compressive axial force to said alignment means; and
   sealing means including a sealing tube which completely encloses said alignment and compression means for environmentally sealing the connection against infiltration of moisture and other contaminants.

2. Apparatus as claimed in claim 1, wherein said alignment means comprises one guide member for each of said two cables, each guide member having an inner bore adapted to receive an optical fiber, and an alignment sleeve which fits over at least a portion of each of said guide members to provide axial and angular alignment of said optical fibers.

3. Apparatus as claimed in claim 2, wherein said guide members comprise a ceramic material.

4. Apparatus as claimed in claim 2, wherein said guide members and said alignment sleeve are each cylindrical.

5. Apparatus as claimed in claim 4, wherein said optical cables each comprises an optical fiber core, a cable buffer surrounding said core, a strength member surrounding said buffer, and a jacket surrounding said strength member.

6. Apparatus as claimed in claim 5, further comprising cable support means for receiving said guide members and said cables, said cable support means comprising one cable support member for each cable, each cable support member including a cable support portion having an inner diameter approximately equal to an outer diameter of said cable buffer, said support portion extending between said buffer and said strength member, and a main body portion having an inner diameter approximately equal to an outer diameter of one of said guide members, said main body portion inner diameter being larger than said support portion inner diameter to form a shoulder, and means on said main body portion for engaging said compression means to thereby transfer an axial compression force from said compression means to said guide members via said shoulder.

7. Apparatus as claimed in claim 6, wherein said cable support member comprises a stainless steel material.

8. Apparatus as claimed in claim 6, wherein said compression means comprises a single resilient member.

9. Apparatus as claimed in claim 8, wherein said resilient member comprises legs and said means on said main body portion for engaging said compression means comprises a circumferential lip adapted to engage one of said legs.

10. Apparatus as claimed in claim 9, wherein said legs are adapted to snap on respective main body portions of said cable support members.

11. Apparatus as claimed in claim 6, further comprising means including a terminus shrink tube surrounding said cable strength member and said jacket for preventing fraying of exposed portions of the cable strength member and jacket, and for securing said cable support member within said cable strength member.

12. Apparatus as claimed in claim 1, wherein said sealing tube is a meltable inner wall shrink tube.

13. Apparatus as claimed in claim 12, wherein said meltable inner wall shrink tube comprises a length of shrink tubing having an inner surface coated with hot melt adhesive.

14. Apparatus for connecting two optical cables, each cable comprising an optical fiber core, a cable buffer surrounding said core, and a strength member surrounding said buffer, comprising:
  alignment means including one guide member for each of said two cables, each guide member having an inner bore adapted to receive an optical fiber, and an alignment sleeve which fits over at least a portion of each of said guide members to provide axial and angular alignment of said optical fibers, said guide members and alignment sleeve each being cylindrical;
  compression means for applying a compressive axial force to said alignment means;
  one cable support member for each cable, each cable support member including a cable support portion having an inner diameter approximately equal to an outer diameter of said cable buffer, said support portion extending between said buffer and said strength member, and a main body portion having an inner diameter approximately equal to an outer diameter of one of said guide members, said main body portion inner diameter being larger than said support portion inner diameter to form a shoulder, and means on said main body portion for engaging said compression means to thereby transfer an axial compression force from said compression means to said guide members via said shoulder; and
  means including a sealing tube which completely encloses said alignment means, said compression means, and said cable support members for environmentally sealing the connection against infiltration of moisture and other contaminants.

15. Apparatus as claimed in claim 14, wherein said guide members comprise a ceramic material.

16. Apparatus as claimed in claim 14, wherein said cable support means comprises a stainless steel material.

17. Apparatus as claimed in claim 14, wherein said compression means comprises a single resilient member.

18. Apparatus as claimed in claim 17, wherein said resilient member comprises legs adapted to snap on a respective main body portion of said cable support members.

19. Apparatus as claimed in claim 14, further comprising means including a terminus shrink tube surrounding said cable strength member and a cable jacket for preventing fraying of exposed portions of the cable strength member and jacket, and for securing said cable support member within said cable strength member.

20. Apparatus as claimed in claim 14, wherein said compression means engaging means comprises a circumferential lip on said main body portion.

21. Apparatus for connecting two optical cables, comprising:
  alignment means for axially aligning optical fibers in said two cables, said alignment means including one guide member for each of said two cables and an alignment sleeve which fits over each of said guide members, each guide member having an inner bore adapted to receive an optical fiber;
  cable support means including two cable support members for receiving said optical cables and said guide members;
  compression means including a single resilient member for applying a compressive axial force to said alignment means by engaging said cable support members; and
  sealing means including a sealing tube which completely encloses said alignment means, said cable support means, and said compression means for environmentally sealing the connection against infiltration of moisture and other contaminants.

22. Apparatus as claimed in claim 21, wherein said support means comprises a circumferential lip and said resilient member comprises legs adapted to engage said lip.

23. Apparatus as claimed in claim 9, wherein said legs are adapted to snap on said cable support means.

24. A kit of parts for effecting an optical connection between two optical cables, each including a cable strength member and jacket, consisting essentially of alignment means for axially aligning optical fibers in said two cables; compression means for applying a compressive axial force to said alignment means; terminus means for preventing fraying of exposed portions of said cable strength member and jacket; and a shrink tube adapted to completely enclose said alignment and compression means when said alignment and compression means are installed to effect an optical connection between two cables.

25. A kit as claimed in claim 24, wherein said alignment means comprises one guide member for each of said two cables, each guide member having an inner bore adapted to receive an optical fiber, and an alignment sleeve which fits over at least a portion of each of said guide members to provide axial and angular alignment of said optical fibers.

26. A kit as claimed in claim 24, wherein said compression means consists of a single resilient member.

27. A kit as claimed in claim 24, wherein said shrink tube comprises a meltable inner wall shrink tube.

28. A kit as claimed in claim 24, wherein said alignment means comprises two ceramic guide members, each having an inner bore adapted to receive an optical fiber; two cable support members, each having a cable support portion having an inner diameter approximately equal to an outer diameter of a cable buffer, and a main body portion having an inner diameter approximately equal to an outer diameter of one of the guide members, the main body portion inner diameter being larger than the support portion inner diameter to form a shoulder, and a cylindrical alignment sleeve which fits over at least a portion of each of the guide members; and wherein said compression means comprises a single resilient member including two legs adapted to engage a lip on each of said two main body portions of said cable support members.

29. A kit as claimed in claim 24, wherein said terminus means comprises two terminus shrink tubes adapted to surround a respective cable strength member and a respective cable jacket of each of two cables to be coupled for securing said cable support members within said cable strength members.

30. A method of effecting a splice connection for two optical cables, comprising the steps of:

(a) stripping an optical fiber cable to expose a length of optical fiber, a length of a cable buffer and a length of cable reinforcement;

(b) inserting a cable support member between said cable buffer and said cable reinforcement;

(c) inserting said exposed length of optical fiber into a bore in a guide member and inserting the guide member into said cable support member;

(d) repeating steps a–c with respect to the second optical fiber cable;

(e) inserting said guide members into an alignment sleeve;

(f) snapping a splice clip onto said cable support members to apply compressive axial force on respective cable support and guide members of said two cables;

(g) enclosing said cable support members, guide members, alignment sleeve, and splice clip within a sealing tube;

(h) securing said sealing tube to said cables.

31. A method as claimed in claim 30, further comprising the step of trimming said optical fiber to be flush with said guide member.

32. A method as claimed in claim 30, wherein step (g) comprises the step of placing a meltable inner wall shrink tube over said splice connection and wherein step (h) comprises the step of applying heat to shrink said tube and thereby environmentally seal the connection against infiltration of moisture and contaminants.

33. A method as claimed in claim 30, further comprising the steps of, for each cable, of placing a terminus shrink tube around said length of cable reinforcement and around a cable jacket, and shrinking said shrink tubing to prevent fraying of exposed portions of said reinforcement and jacket.

* * * * *